US008686090B2

(12) United States Patent
Green et al.

(10) Patent No.: US 8,686,090 B2
(45) Date of Patent: Apr. 1, 2014

(54) USE OF UREA CRYSTALS FOR NON-POLYMERIC COATINGS

(75) Inventors: Marvin L. Green, Brighton, MI (US); Swaminathan Ramesh, Canton, MI (US); Walter H. Ohrbom, Hartland Township, MI (US)

(73) Assignee: BASF Coatings GmbH, Southfield, MI (US)

( * ) Notice: Subject to any disclaimer, the term of this patent is extended or adjusted under 35 U.S.C. 154(b) by 1783 days.

(21) Appl. No.: 10/732,850

(22) Filed: Dec. 10, 2003

(65) Prior Publication Data

US 2005/0131134 A1    Jun. 16, 2005

(51) Int. Cl.
| | |
|---|---|
| *B01F 17/00* | (2006.01) |
| *B05D 3/02* | (2006.01) |
| *C08F 283/00* | (2006.01) |
| *C08F 283/02* | (2006.01) |
| *C08F 283/04* | (2006.01) |
| *C08G 6/02* | (2006.01) |
| *C08G 8/28* | (2006.01) |
| *C08G 12/42* | (2006.01) |
| *C08G 18/00* | (2006.01) |
| *C08G 18/08* | (2006.01) |
| *C08G 18/28* | (2006.01) |
| *C08G 18/42* | (2006.01) |
| *C08G 18/67* | (2006.01) |
| *C08G 18/83* | (2006.01) |
| *C08G 63/08* | (2006.01) |
| *C08G 63/44* | (2006.01) |
| *C08G 63/91* | (2006.01) |
| *C08G 65/32* | (2006.01) |
| *C08G 67/02* | (2006.01) |
| *C08G 69/00* | (2006.01) |
| *C08G 69/44* | (2006.01) |
| *C08K 5/00* | (2006.01) |
| *C08L 51/00* | (2006.01) |
| *C08L 61/00* | (2006.01) |
| *C08L 61/02* | (2006.01) |
| *C08L 63/00* | (2006.01) |
| *C08L 67/00* | (2006.01) |
| *C08L 67/02* | (2006.01) |
| *C08L 69/00* | (2006.01) |
| *C08L 71/00* | (2006.01) |
| *C08L 75/00* | (2006.01) |
| *C08L 77/00* | (2006.01) |
| *C08L 79/00* | (2006.01) |

(52) U.S. Cl.
USPC .............. 524/589; 427/372.2; 427/385.5; 524/211; 524/212; 524/437; 524/542; 524/590; 524/601; 524/602; 524/604; 524/612; 525/414; 525/450; 525/453; 525/454; 525/456; 525/465; 525/467; 525/509; 525/519; 525/522; 528/44; 528/288

(58) Field of Classification Search
USPC ............ 427/372.2, 385.5; 524/211, 212, 537, 524/542, 589, 590, 601, 602, 604, 612; 528/44, 288; 525/414, 450, 453, 454, 525/456, 465, 467, 509, 519, 522
See application file for complete search history.

(56) References Cited

U.S. PATENT DOCUMENTS

| | | |
|---|---|---|
| 3,547,848 A | 12/1970 | Marsh |
| 3,893,956 A | 7/1975 | Brandt |
| 4,169,930 A | 10/1979 | Blount |
| 4,311,622 A | 1/1982 | Buter |
| 4,383,068 A | 5/1983 | Brandt |
| 4,403,003 A | 9/1983 | Backhouse |
| 4,416,941 A | 11/1983 | Barsotti |
| 4,425,468 A | 1/1984 | Makhlouf et al. |
| 4,522,958 A | 6/1985 | Das et al. |
| 4,528,319 A | 7/1985 | Ottaviani et al. |
| 4,647,647 A | 3/1987 | Haubennestel et al. |
| 4,677,028 A | 6/1987 | Heeringa et al. |
| 4,762,752 A | 8/1988 | Haubennestel et al. |
| 4,833,146 A | 5/1989 | Gebert et al. |
| 4,839,406 A | 6/1989 | Natura et al. |
| 4,851,294 A | 7/1989 | Buter et al. |
| 4,851,460 A | 7/1989 | Stranghöner et al. |
| 4,882,408 A | 11/1989 | Blum |
| 4,965,317 A | 10/1990 | Kania et al. |
| 5,264,486 A | 11/1993 | Piestert |
| 5,336,566 A | 8/1994 | Rehfuss |
| 5,356,669 A | 10/1994 | Rehfuss et al. |
| 5,391,620 A | 2/1995 | Bederke et al. |
| 5,451,656 A | 9/1995 | Menovcik |
| 5,468,461 A | 11/1995 | Hosoda et al. |

(Continued)

FOREIGN PATENT DOCUMENTS

| | | |
|---|---|---|
| DE | 16 19 816 | 10/1970 |
| DE | 4423260 | 1/1996 |

(Continued)

OTHER PUBLICATIONS

Fink, Johannes Karl, "Reactive Polymers Fundamentals and Applications A Concise guide to Industrial Polymers", 2005, p. 82.*
Heeringa et al., entitled "Sag Control Agents for Rheology Control in Automotive Topcoats" pp. 201-222 and the Abstract.
English Language for WO03/91350, Publication Date Nov. 6, 2003, entitled "Heat-curable Thixotropic mixtures containing carbamate and/or allophanate groups", pp. 143.
HCAPLUS Accession No. 1969:20743, English abstract for DE1619816, Oct. 22, 1970.
Abstract for DE4423260, Jan. 4, 1996, provided by EPO.
Abstract for DE19811471, Sep. 23, 1999, provided by EPO.
Abstract for JP64-024851, Jan. 26, 1989, provided by JPO.

(Continued)

*Primary Examiner* — Patrick Niland
(74) *Attorney, Agent, or Firm* — Quinn Law Group, PLLC

(57) ABSTRACT

The thermosetting, non-polymeric coating composition includes at least one monomeric material having a plurality of carbamate and/or urea groups, at least one crosslinker reactive with the at least one monomeric material, and a sag control agent that is a crystalline reaction product of an amine and an isocyanate.

11 Claims, No Drawings

(56) References Cited

U.S. PATENT DOCUMENTS

| | | | |
|---|---|---|---|
| 5,508,379 A | 4/1996 | Menovcik et al. | |
| 5,512,639 A | 4/1996 | Rehfuss et al. | |
| 5,532,061 A | 7/1996 | Menovcik et al. | |
| 5,639,828 A | 6/1997 | Briggs et al. | |
| 5,693,723 A | 12/1997 | Green | |
| 5,693,724 A | 12/1997 | Green | |
| 5,756,213 A * | 5/1998 | Ohrbom et al. | 428/412 |
| 5,872,195 A * | 2/1999 | Green et al. | 525/481 |
| 5,977,256 A | 11/1999 | Huybrechts et al. | |
| 6,111,001 A | 8/2000 | Barancyk et al. | |
| 6,136,762 A | 10/2000 | Yoshinari et al. | |
| 6,403,699 B1 | 6/2002 | Röckrath et al. | |
| 6,410,646 B1 | 6/2002 | Röckrath et al. | |
| 6,630,537 B1 | 10/2003 | Baumgart et al. | |
| 6,642,305 B2 | 11/2003 | Van Heugten et al. | |
| 6,649,706 B1 | 11/2003 | Heid et al. | |
| 6,652,915 B1 | 11/2003 | Baumgart et al. | |
| 6,652,916 B1 | 11/2003 | Baumgart et al. | |
| 2002/0082324 A1 | 6/2002 | Van Heugten et al. | |
| 2002/0119253 A1* | 8/2002 | Ohrbom et al. | 427/384 |
| 2002/0155278 A1 | 10/2002 | Boisseau et al. | 428/331 |
| 2003/0180539 A1 | 9/2003 | Rockrath et al. | |

FOREIGN PATENT DOCUMENTS

| | | |
|---|---|---|
| DE | 19811471 | 9/1999 |
| DE | 10118532 | 10/2002 |
| EP | 038127 | 3/1981 |
| JP | 60-120750 | 6/1985 |
| WO | WO97/12945 | 4/1997 |
| WO | WO00/32670 | 6/2000 |
| WO | WO02/090414 | 11/2002 |
| WO | WO03/000813 | 1/2003 |
| WO | WO03/014233 | 2/2003 |
| WO | WO03/091350 | 11/2003 |

OTHER PUBLICATIONS

Derwent Accession No. 1999-199134, English abstract for JP 11043640, Feb. 16, 1999.

Derwent Accession No. 1982-01817J, English abstract for SU889614, Jan. 23, 1982.

Derwent Accession No. 2003-542800, English abstract for DE10118532, Oct. 24, 2002.

U.S. Appl. No. 09/856,773, filed Nov. 15, 1998, Entitled "Coating composition and process its preparation", Baumgart et al. (IN-5498).

U.S. Appl. No. 09/779,948, filed Feb. 9, 2001, Entitled "Method of improving the appearance of coating articles having both vertical and horizontal surfaces, and coating compositions for use therein", Boisseau et al. (IN-5436).

U.S. Appl. No. 10/344,614, filed Feb. 12, 2003, Entitled "Trixotropic agent that can be activated using actinic radiation, a method for its production and the use thereof", Röckrath, et al. (IN-5657).

U.S. Appl. No. 10/473,728, filed Oct. 10, 2003, Entitled "Mixtures which contain carbamate groups and/or allophanate groups and can be cured thermally and by using actinic radiation", Baumgart et al. (IN-5731).

U.S. Appl. No. 10/473,730, filed Oct. 1, 2003, Entitled "Thermally curable, thixotropic blends containing carbamate and allophanatae groups", Baumgart et al. (IN-5714).

\* cited by examiner

USE OF UREA CRYSTALS FOR NON-POLYMERIC COATINGS

FIELD OF THE INVENTION

The invention concerns thermosetting, non-polymeric coating compositions.

BACKGROUND OF THE INVENTION

Carbamate-functional and urea-functional materials have found particular utility in coating compositions as crosslinkable resins. Curable coating compositions utilizing carbamate-functional resins are described, for example, in U.S. Pat. Nos. 5,693,724, 5,693,723, 5,639,828, 5,512,639, 5,508,379, 5,451,656, 5,356,669, 5,336,566, and 5,532,061, each of which is incorporated herein by reference. These coating compositions can provide significant advantages over other coating compositions, such as hydroxy-functional acrylic/melamine coating compositions. For example, the coatings produced using carbamate-functional resins typically have excellent resistance to environmental etch (also called acid etch). Environmental etch results in spots or marks on or in the coating that often cannot be rubbed out.

One drawback of coatings with carbamate-functional resins is that they tend to require more organic solvent to achieve acceptable viscosity and for application. Carbamate-functional materials prepared from an isocyanurate of a diisocyanate, for example, are generally advantageous as an additive resin or principal resin in a coating composition, but these materials increase the viscosity of the coating composition so that more solvent is required. Coatings with higher amounts of organic solvent produce more regulated emissions during application.

The content of volatile organic compounds has also been reduced by using resins of lower viscosity, for example very low molecular weight polymeric or oligomeric materials or reactive diluent compounds. Such materials are particularly susceptible to sagging during the initial stages of baking, however, due to their rheology profile on heating. On the other hand, many agents that may be added to control rheology (so-called rheology control agents, or, in this case, anti-sagging agents) also significantly increase the viscosity of the coating composition. Hence, there is no benefit in using such rheology control agents over simply increasing the molecular weight of the reactive vehicle components.

U.S. Pat. Nos. 4,311,622, 4,677,028, and 4,851,294 describe sag control agents for coatings that are the crystalline reaction products of an amine and a diisocyanate, optionally reacted in the presence of a resinous binder. These sag control agents are crystalline, and their effectiveness depends on size and shape of the crystals as well as their concentration in the coating composition. The polymers in the coating compositions of these patents appear to be generally hydroxyl functional. Barancyk et al., U.S. Pat. No. 6,111,011, discloses polymeric coating compositions containing a rheology modifier comprising the reaction product of an amine and an isocyanate. It would be desirable, however, to have a higher solids coating composition that would not sag during application or curing.

Thus, it would be desirable to have a curable coating composition that contains carbamate-functional and/or urea-functional materials because of the superior coating properties of cured coating produced form such composition, while at the same time having lower organic solvent content in such composition without the unacceptable sagging the usually accompanies compositions made with extremely low molecular weight materials.

SUMMARY OF THE INVENTION

In one aspect, the present invention provides a thermosetting, non-polymeric coating composition comprising at least one monomeric material having a plurality of active hydrogen groups, particularly carbamate groups, terminal urea groups, hydroxyl groups, and/or carboxylic acid groups; at least one crosslinker reactive with the at least one monomeric material; and a crystalline reaction product of a primary monoamine and a polyisocyanate. Primary monoamines have a basic structure of $RNH_2$, where R does not contain another amine group, but may contain other functional groups. The coating composition may be formulated with a low content of volatile organic compounds (VOC) and is resistant to sagging. The coating composition is preferably a clearcoat composition.

In another aspect, the invention provides a thermosetting, non-polymeric coating composition comprising at least one monomeric material having a plurality of active hydrogen groups, particularly carbamate groups, terminal urea groups, hydroxyl groups, and/or carboxylic acid groups; a crystalline reaction product of a primary monoamine and a polyisocyanate; and at least one crosslinker reactive with the at least one monomeric material and with the crystalline reaction product.

The present invention further provides a method of coating a substrate with a coating composition, having steps of applying a layer of thermosetting, non-polymeric coating composition comprising at least one monomeric material having a plurality of active hydrogen groups, at least one crosslinker reactive with the at least one monomeric material, and a crystalline reaction product of a primary monoamine and an isocyanate and curing the applied layer to produce a cured coating layer on the substrate.

The present invention still further provides a method a applying the coating composition as a clearcoat layer over a previously applied basecoat coating layer. The basecoat coating layer may already be cured or may be cured at the same time as the applied clearcoat layer.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

DETAILED DESCRIPTION OF THE PREFERRED EMBODIMENTS

The following description of the preferred embodiment(s) is merely exemplary in nature and is in no way intended to limit the invention, its application, or uses.

The thermosetting, non-polymeric coating composition includes at least one monomeric material having a plurality of active hydrogen groups, at least one crosslinker reactive with the at least one monomeric material, and a sag control agent that is a crystalline reaction product of a primary monoamine and a polyisocyanate. Examples of suitable active hydrogen groups include, without limitation, carbamate groups, terminal urea groups, hydroxyl groups, carboxylic acid groups, mercapto groups, primary amine groups, secondary amine groups, amides of primary amines, and combinations of these. Particularly preferred active hydrogen groups are carbamate groups, terminal urea groups, hydroxyl groups, and/or carboxylic acid groups. Monomeric material with other reactive groups, e.g. silane groups, may also be included. The monomeric material may be di-functional, tri-functional, or have a higher degree of functionality (e.g., tetra-, penta-, etc. functional). The monomeric material, for example, may have an alkenyl, alkynyl, cycloalkyenyl, cycloalkynyl, or aromatic moiety bearing the functional groups, or may have a hyperbranched moiety bearing the functional groups, such as disclosed, e.g., in Ramesh, U.S. Pat. No. 6,569,956, filed Dec. 22, 1999 and issued May 27, 2003, and Ramesh, U.S. Pat. No. 6,462,144, filed Feb. 26, 2001 and issued Oct. 8, 2002, each of which is incorporated herein by reference.

In one preferred embodiment, at least one monomeric material of the coating composition has a plurality of carbamate and/or terminal urea groups. The term "carbamate group" as used in connection with the present invention refers to a group having a structure

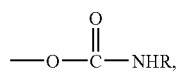

in which R is H or alkyl, preferably R is H or alkyl of from 1 to about 8 carbon atoms, more preferably R is H or alkyl of from 1 to about 4 carbon atoms, and yet more preferably R is H. When R is H, the carbamate group is referred to herein as a primary carbamate group. The term "terminal urea group" as used in connection with the present invention refers to a group having a structure

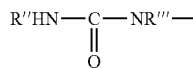

in which R" and R'" are each independently H or alkyl or R" and R'" together form a heterocyclic ring structure. Preferably, R and R'" are each independently or together form an ethylene bridge, and more preferably R and R'" are each H (a primary terminal urea).

Such carbamate-functional or terminal urea-functional monomeric compounds include, without limitation, any of those described in U.S. Pat. Nos. 6,160,058, 6,084,038, 6,080,825, 5,994,479, the disclosures of which are incorporated by reference. In particular, the composition may include a carbamate-functional or terminal urea-functional monomeric material comprising at least two functional groups, at least one of which is a carbamate or terminal urea group that is the reaction product of (1) an hydroxyl group of a first compound that is the result of a ring-opening reaction between a compound with an epoxy group and a compound with an organic acid group and (2) cyanic acid or a carbamate or urea group-containing compound.

In another embodiment, the monomeric material may be a carbamate-functional or terminal urea-functional material that is the reaction product of (1) a compound comprising a carbamate or terminal urea group and an active hydrogen group that is reactive with (2), and (2) a lactone or an hydroxy carboxylic acid. In a particularly preferred embodiment, the active hydrogen group of compound (1) is an hydroxyl group and the compound (2) is ε-caprolactone. The compound (1) may be, for example and without limitation, hydroxyethyl carbamate, hydroxypropyl carbamate, or hydroxybutyl carbamate.

In another embodiment, the monomeric material may be a carbamate-functional or terminal urea-functional material that is the reaction product of a first material (A) that is prepared by reacting (1) a compound comprising a primary carbamate or terminal urea group and an hydroxyl group and (2) a lactone or a hydroxy carboxylic acid, as just described, further reacted with a second material (B) that is reactive with hydroxyl groups on a plurality of molecules of compound (1), but that is not reactive with the carbamate or urea groups on compound (1). For example, the compound (B) may be a polyisocyanate, especially an isocyanate, particularly the isocyanurate of isophorone diisocyanate. Again, the compound (2) is preferably ε-caprolactone.

In yet another embodiment, the monomeric material may be a carbamate-functional or urea-functional material that is the reaction product of a first material (A) that is prepared by reacting (1) a compound comprising a primary carbamate or primary urea group and an hydroxyl group and (2) a lactone or a hydroxy carboxylic acid, as just described, further reacted with a second material or materials (B) that converts an hydroxyl group on the reaction product to a carbamate group, or a component comprising a group that is reactive with a hydroxyl group and a carbamate or urea group or group that can be converted to carbamate or urea. The hydroxyl group can be reacted, for example, without limitation, with monoisocyanates such as methyl isocyanate and butyl isocyanate, which react to form a secondary carbamate group; cyanic acid (which can be formed by the thermal decomposition of urea), which reacts with hydroxyl groups to form a primary carbamate group; or phosgene, followed by reaction with ammonia (primary carbamate group) or a primary amine (secondary carbamate group).

In another embodiment, the monomeric material may be a carbamate-functional or terminal urea-functional material that is the reaction product of (1) a compound comprising a primary carbamate or terminal urea group and an hydroxyl group and (2) a compound that is reactive with hydroxyl groups on a plurality of molecules of compound (1), but that is not reactive with the carbamate or terminal urea groups on compound (1). The compound (1) may be, for example and without limitation, hydroxyethyl carbamate, hydroxypropyl carbamate, or hydroxybutyl carbamate. The compound (2) is preferably a diisocyanate, triisocyanate, isocyanurate or biuret thereof, mixture of such compounds. Particularly preferred compounds (2) are the isocyanurate of isophorone diisocyanate and the isocyanurate of hexamethylene diisocyanate.

In another preferred embodiment, the monomeric material may be a carbamate-functional or terminal urea-functional material that is the reaction product of (1) a first material that is the reaction product of a mixture including at least a polyisocyanate and an active hydrogen-containing chain extension agent with (2) a compound comprising a group that is reactive with said first material and a carbamate or terminal urea group or group that can be converted to a carbamate or terminal urea group. Suitable examples of the material (1) include, without limitation, the reaction product of a mixture including at least one of a diisocyanate, triisocyanate, isocyanurate or biuret thereof, mixture of such compounds, and at least one chain extension agent selected from 1,6-hexanediol, cyclohexanedimethylol, 2-ethyl-1,6-hexanediol, 3-hydroxy-2,2-dimethylpropyl 3-hydroxy-2,2-dimethylpropionate, 1,4-butanediol, and mixtures thereof. Suitable examples of compound (2) include, without limitation, hydroxyethyl carbamate, hydroxybutyl carbamate, hydroxypropyl carbamate, and combinations of these.

In a preferred embodiment, the monomeric material may be a material as described in Ohrbom et al., U.S. Pat. No. 6,541,594, filed Dec. 19, 2000 and issued Apr. 1, 2003, incorporated herein by reference. The clearcoat coating composition particularly includes a carbamate-functional material having at least two carbamate groups, preferably two to four carbamate groups, and more preferably two carbamate groups and a hydrocarbon moiety with about 24 to about 72 carbon atoms, preferably about 36 to about 72 carbon atoms, and more preferably about 36 to about 54 carbon atoms, and particularly preferably about 36 carbon atoms. The hydrocarbon moiety may include cycloaliphatic or aromatic structures. Such materials may be prepared, for example, by addition reaction of unsaturated monofunctional fatty acids having 12 to 18 carbon atoms according to known methods, followed by conversion of the acid group to a carbamate group. The unsaturated fatty acids may be dimerized, trimerized, or tetramerized. Higher oligomer products are also possible, but not preferred. The acid groups may be converted to carbamate or urea groups by a number of known means. For example, the acid may be reduced to an alcohol group and then the alcohol group reacted with a hydroxy carbamate or urea compound such as hydroxypropyl carbamate or hydroxyethylene ethyl urea to introduce the carbamate functionality. Another method of synthesis involves reaction of an hydroxyl group with cyanic acid (which may be formed by the thermal decomposition of urea). Hydroxyl groups can also be converted to carbamate groups by reaction with low molecular weight monoisocyanates (e.g., methyl isocyanate, ethyl isocyanate, propyl isocyanate, and butyl isocyanate). An hydroxyl group can also be reacted with phosgene and then ammonia or a primary amine to form a carbamate group.

Preferred examples of such materials include compounds of the following structures:

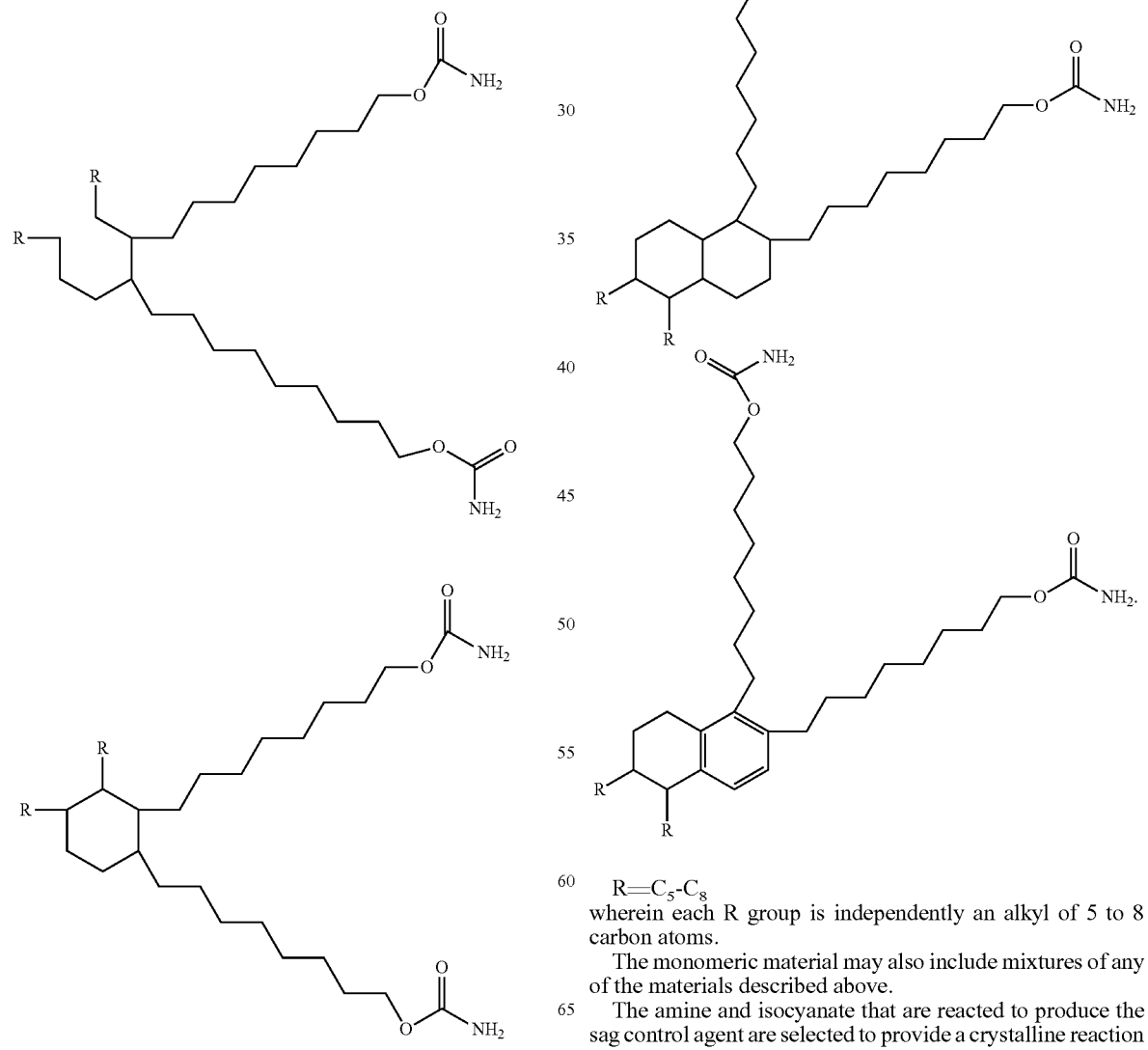

$R = C_5 - C_8$ wherein each R group is independently an alkyl of 5 to 8 carbon atoms.

The monomeric material may also include mixtures of any of the materials described above.

The amine and isocyanate that are reacted to produce the sag control agent are selected to provide a crystalline reaction product. The amine may contain one or more amino groups, but preferably the amine is a monoamine and more preferably a monoprimary amine. Suitable monoamines include benzylamine, ethylamine, propylamine, butylamine, pentylamine, hexylamine, methylbutylamine, ethylpropylamine and ethylbutylamine. Additionally, hydroxy containing monoamines may be used such as 2-aminoethanol, 1-aminoethanol, 2-aminopropanol, 3-aminopropaol, 1-amino-2-propanol, 2-amino-2-methylpropanol, 2-aminobutanol, 2-amino-2-methyl-1,3-propanediol, and 2-amino-2-ethyl-1,3-propanediol. Preferably, the monoamine is benzylamine or hexylamine. Examples of other suitable amines for use in the preparation of the rheology modifier are those described in U.S. Pat. Nos. 4,311,622 and 4,677,028.

The isocyanates useful in the preparation of the rheology modifier are preferably monomeric isocyanates, more preferably, monomeric di- or tri-isocyanates. The polyisocyanate can be an aliphatic, cycloaliphatic or aromatic polyisocyanate, or mixtures thereof. Diisocyanates are preferred, although higher polyisocyanates such as triisocyanates can be used either in place of or in combination with diisocyanates. Examples of the aliphatic isocyanates are trimethylene, tetramethylene, tetramethylxylylene, pentamethylene, hexamethylene, 1,2-propylene, 1,2-butylene, 2,3-butylene, and 1,3-butylene diisocyanates. Also suitable are cycloaliphatic isocyanates such as 1,3-cyclopentane and isophorone diisocyanates aromatic isocyanates such as m-phenylene, p-phenylene and diphenylmethane-4,4-diisocyanate; aliphatic-aromatic isocyanates such as 2,4- or 2,6-tolulene diisocyanate and 1,4-xylylene diisocyanate; nuclear-substituted aromatic isocyanates such as dianisidine diisocyanate and 4,4-diphenylether diisocyanate; triphenylmethane-4,4,4-triisocyanate, and 1,3,5-triisocyanatobenzene; and biurets and isocyanurates of diisocyanates such as the isocyanurates of tolulene diisocyanate and hexamethylene diisocyanate. Isothiocyanates corresponding to the above-described isocyanates, where they exist, can be employed as well as mixtures of materials containing both isocyanate and isothiocyanate groups. Isocyanates are commercially available. Preferably the polyfunctional monomeric isocyanate is 1,6-hexamethylene diisocyanate. In each case, the polyisocyanate is selected to provide a product that is a solid at ambient temperature. Examples of further suitable isocyanates are described in U.S. Pat. Nos. 4,311,622 and 4,677,028.

The equivalent ratio of amine to isocyanate ranges from 0.7 to 1.5:1, preferably 1:1, with the primary amine group being considered monofunctional. For optimum sag control, the rheology modifier is crystalline.

Generally, the rheology modifier may be formed by reacting the amine with the isocyanate in a suitable reaction vessel generally at a temperature between about 0° C. and about 40° C., preferably from about 5° C. to about 20° C. in the presence of a diluent. In carrying out the reaction, it is preferred that the isocyanate is added to the amine in the reaction vessel. The reaction product, which preferably has been dispersed in a suitable solvent, may then be added to the coating composition.

The rheology modifier may be incorporated via a batch process as described in U.S. Pat. Nos. 4,311,622, 4,622,028 and 4,851,294, or, via a continuous process. Generally, the continuous process for preparing the rheology modifier comprises the simultaneous metering of the amine, the isocyanate, or the reaction product thereof, and the polymer (a), or the polymer (c), into a first high shear mixer to form a mixture as the ingredients flow into and through the first high shear mixer; continuously flowing the mixture into and through a low shear mixing stage; then continuously flowing the mixture into and through a second high shear mixer. Alternatively, the amine and the polymer (a), or the polymer (c), may be premixed prior to the first high shear mixing step.

The amount of the rheology modifier in the composition, based on solids of the composition, is preferably from about 0.1 to about 5, more preferably about 0.2 to about 4.5, even more preferably from about 0.3 to about 4, still more preferably 0.4 to about 3.5, and most preferably 0.5 to about 3% by weight. "Solids" refers to the sum of the materials constitute the coating following curing of the coating, In one embodiment, fumed silica is also incorporated into the coating composition. Fumed silica has a greater effect when used in conjunction with the crystalline reaction product of the primary monoamine and the polyisocyanate. The combination of fumed silica and the crystalline urea reaction product is particularly beneficial for obtaining smooth coating films from spray application of the coating composition on both vertical and horizontal surfaces. The amount of fumed silica in the composition, based on solids of the composition, is preferably from about 0.1 to about 10, more preferably about 0.2 to about 9, even more preferably from about 0.3 to about 8, still more preferably 0.4 to about 7, and most preferably 0.5 to about 6% by weight.

The coating composition further includes one or more crosslinkers reactive with active hydrogen groups. Particularly useful crosslinkers include, without limitation, materials having active methylol or methylalkoxy groups, such as aminoplast crosslinking agents or phenol/formaldehyde adducts. Examples of preferred curing agent compounds include melamine formaldehyde crosslinkers, including monomeric or polymeric melamine resin and partially or fully alkylated melamine resin, urea resins, and methylol ureas such as urea formaldehyde resin, alkoxy ureas such as butylated urea formaldehyde resin. Other useful crosslinkers include, without limitation, polyisocyanates and blocked polyisocyanates. The curing agent may be combinations of these. Aminoplast resins such as melamine formaldehyde resins or urea formaldehyde resins are especially preferred.

In preferred embodiments, the crosslinker is at least about 5%, more preferably at least about 10% by weight of the nonvolatile vehicle. "Nonvolatile vehicle" refers to the film-forming components. It is also preferred for the crosslinker to be up to about 40%, more preferably up to about 30% by weight of the nonvolatile vehicle. The crosslinker is preferably from about 5% to about 40%, more preferably from about 10% to about 35%, and still more preferably from about 15% to about 35% by weight of the nonvolatile vehicle.

The coating composition may include a catalyst to enhance the cure reaction. For example, when aminoplast compounds, especially monomeric melamines, are used as a curing agent, a strong acid catalyst may be utilized to enhance the cure reaction. Such catalysts are well-known in the art and include, without limitation, p-toluene sulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

A solvent or solvents may be utilized in the coating composition. In general, the solvent can be any organic solvent and/or water. In one preferred embodiment, the solvent includes a polar organic solvent. More preferably, the solvent includes one or more organic solvents selected from polar aliphatic solvents or polar aromatic solvents. Still more preferably, the solvent includes a ketone, ester, acetate, aprotic amide, aprotic sulfoxide, aprotic amine, or a combination of any of these. Examples of useful solvents include, without limitation, methyl ethyl ketone, methyl isobutyl ketone, m-amyl acetate, ethylene glycol butyl ether-acetate, propylene glycol monomethyl ether acetate, xylene, N-methylpyrrolidone, blends of aromatic hydrocarbons, and mixtures of these. In another preferred embodiment, the solvent is water or a mixture of water with small amounts of co-solvents.

When the coating composition is a primer composition or pigmented topcoat composition, such as a basecoat composition, one or more pigments and/or fillers may be included. Pigments and fillers may be utilized in amounts typically of up to 40% by weight, based on total weight of the coating composition. The pigments used may be inorganic pigments, including metal oxides, chromates, molybdates, phosphates, and silicates. Examples of inorganic pigments and fillers that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), ultramarine, lead chromate, lead molybdate, and mica flake pigments. Organic pigments may also be used. Examples of useful organic pigments are metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like.

Additional agents, for example hindered amine light stabilizers, ultraviolet light absorbers, anti-oxidants, surfactants, stabilizers, wetting agents, rheology control agents, dispersing agents, adhesion promoters, etc. may be incorporated into the coating composition. Such additives are well-known and may be included in amounts typically used for coating compositions.

Coating compositions can be coated on the article by any of a number of techniques well-known in the art. These include, for example, spray coating, dip coating, roll coating, curtain coating, and the like. For automotive body panels, spray coating is preferred.

The coating composition can be applied onto many different substrates, including metal substrates such as bare steel, phosphated steel, galvanized steel, or aluminum; and non-metallic substrates, such as plastics and composites. The substrate may also be any of these materials having upon it already a layer of another coating, such as a layer of an electrodeposited primer, primer surfacer, and/or basecoat, cured or uncured.

Application can be, for example, by electrostatic spraying or by use of a fluidized bed. Electrostatic spraying is the preferred method. The coating composition can be applied in one or more passes to provide a film thickness after cure of typically from about 20 to about 100 microns.

After application of the coating composition to the substrate, the coating is cured, preferably by heating at a temperature and for a length of time sufficient to cause the reactants to form an insoluble polymeric network. The cure temperature is usually from about 105° C. to about 175° C., and the length of cure is usually about 15 minutes to about 60 minutes. Preferably, the coating is cured at about 120° C. to about 150° C. for about 20 to about 30 minutes. Heating can be done in infrared and/or convection ovens.

The coating composition is preferably utilized as the clearcoat of an automotive composite color-plus-clear coating. The pigmented basecoat composition over which it is applied may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups.

Basecoat polymers may be self-crosslinkable, or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

The clearcoat coating composition is generally applied wet-on-wet over a basecoat coating composition as is widely done in the industry. The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the crosslinking agents, however they generally range between 90° C. and 180° C. In a preferred embodiment, the cure temperature is preferably between 115° C. and 150° C., and more preferably at temperatures between 115° C. and 140° C. for a blocked acid catalyzed system. For an unblocked acid catalyzed system, the cure temperature is preferably between 80° C. and 100° C. The curing time will vary depending on the particular components used, and physical parameters such as the thickness of the layers; however, typical curing times range from 15 to 60 minutes, and preferably 15-25 minutes for blocked acid catalyzed systems and 10-20 minutes for unblocked acid catalyzed systems. The curing times may also be expressed as time after metal temperature reaches the bake temperature ("metal temperature"). For example, the curing time may be for 5 to 30 minutes, preferably 10 to 20 minutes, at metal temperature, The invention is further described in the following examples. The examples are merely illustrative and do not in any way limit the scope of the invention as described and claimed. All parts are parts by weight unless otherwise noted.

EXAMPLES

Resin Preparation A. Monomeric Carbamate-Functional Resin 136 g (1 mole) of pentaerythritol was reacted with 508 g (3.3 moles) of hexahydrophthalic anhydride in 100 g of xylene at 120° C. The reaction started to exotherm above 120° C. and care was taken to control it to below 1250° C. End of the reaction was monitored by IR (disappearance of anhydride peaks at 1860 and 1780 cm$^{-1}$) and by acid number titration. The reaction was 100% complete when there were no anhydride peaks by IR and the acid number was 286-289 mg KOH/g nonvolatile. To this polyester acid, 792 g (3.3 equivalents) of glycidyl neodecanoate (Cardura E10, from Resolution Performance Products) was loaded at such a rate that the temperature did not rise above 130° C. After the addition, the reaction mixture was held at 130-135° C. until the titrated acid number was below 3 mg KOH/g nonvolatile and IR showed no epoxide peaks at 845 and 910 cm$^{-1}$. The polyester polyol thus formed had a hydroxyl number as titrated of about 156 mg KOH/g nonvolatile.

This star polyester polyol was then trans-carbamated by reaction with 318 g methyl carbamate (4.24 moles or 1:1.06 equivalents of methyl carbamate to hydroxyl), 8.6 g of triisodecylphosphite (antioxidant), 2.9 g dibutyltin dioxide, and 400 g of toluene. The reaction temperature was maintained between 123-127° C. and the by-product methanol (about 115 g for a 90% reaction) was azeotropically distilled along with toluene. Hydroxyl number was 15 mg KOH/g nonvolatile as determined by titration following completion of the trans-carbamation reaction. The reaction mixture was then subjected to vacuum stripping to remove all the solvent and excess methyl carbamate. It was then re-constituted into methyl propyl ketone. The final solids were adjusted to be 70%.

Example 1

Preparation of Crystalline Reaction Product of Amine and Diisocyanate in Monomeric Material A three-liter reactor was charged with 2293 parts by weight of the carbamate-functional resin of Resin Preparation A (70% nonvolatile content), 56 parts by weight of benzyl amine, and 25 parts by weight of Aromatic 100. The contents of the reactor were stirred under high agitation (about 200 rpm) and cooled to 10° C. A mixture of 44 parts by weight hexamethylene diisocyanate and 57.5 parts by weight Aromatic 100 was added over two hours, keeping the temperature at or below 15° C. The add line was rinsed with 25 parts by weight Aromatic 100, which were added to the reactor. The contents of the reactor were then allowed to warm to room temperature. The product had a solids content of 69% by weight nonvolatile, with no particles larger than 1 micron. Titration of the dispersion product showed no free isocyanate.

Example 2

Preparation of Crystalline Reaction Product of Amine and Diisocyanate in Monomeric Material An Ultra-Turrax (obtained from IKA) equipped with a T25 S1 drive capable of 9000 rpm with a rotor-stator and flow chamber DK25.11 was modified so that a second reactant could be pumped co-axially into the reaction chamber. Thus, a channel inlet was inserted into the flow chamber and through the central area of the flow chamber to discharge a second reactant into the reaction chamber. A first mixture was prepared with 2293 parts by weight of the carbamate-functional resin used in Example 1, 56 parts by weight of benzyl amine, and 25 parts by weight of Aromatic 100 and cooled to less than 10° C. A second mixture was prepared with 44 parts by weight hexamethylene diisocyanate and 57.5 parts by weight Aromatic 100. With the TS-25 drive operating at 9000 rpm, the first mixture was pumped into the inlet port of the flow chamber and the second mixture was pumped into the flow chamber through the added channel inlet. Both mixtures were pumped at rates adjusted so that the additions of the first and second mixtures were simultaneous, beginning and ending together. The dispersion of the diurea crystals in the carbamate-functional resin was collected at the outlet of the flow chamber. The flow chamber was rinsed with 25 parts by weight Aromatic 100, which were added to the dispersion product.

Examples 3-6

Coating Compositions of the Invention

Coating compositions were prepared by combining the materials and parts by weight indicated in the following table.

|  | Example 3 | Example 4 | Example 5 | Example 6 |
|---|---|---|---|---|
| carbamate-functional resin used in Example 1 | 82.82 | 87.34 |  |  |
| carbamate-functional compound[1] |  |  | 61.41 |  |
| carbamate-functional compound[2] |  |  |  | 32.88 |
| carbamate-functional compound[3] |  |  |  | 64.97 |
| hexamethoxymethyl melamine | 13.13 | 13.13 | 24.52 | 15.84 |
| Example 1 Material | 43.48 | 28.99 | 28.99 | 28.99 |
| Fumed Silica Dispersion[4] |  | 15.18 | 15.18 | 15.18 |
| Additives and catalyst | 10.29 | 10.29 | 10.29 | 10.29 |
| Aromatic 100 | 7.00 | 7.00 | 7.00 | 7.00 |
| methyl propyl ketone | 12.27 | 8.90 | 12.77 | 1.58 |

[1]Reaction product (MW 450) of dimethylolpropionic acid, methyl carbamate, and the monoglycidyl ester of versatic acid
[2]Reaction product of dimer fatty alcohol with hydroxypropyl carbamate
[3]Reaction product of the isocyanurate of isophorone diisocyanate with hydroxypropyl carbamate
[4]9.88% by weight fumed silica, 28.56% by weight carbamate-functional acrylic polymer in primary amyl acetate.

Comparison coating compositions were prepared by combining the materials and parts by weight indicated in the following table.

|  | Comparative Example A | Comparative Example B | Comparative Example C | Comparative Example D |
|---|---|---|---|---|
| carbamate-functional resin used in Example 1 | 114.91 | 108.73 |  |  |
| carbamate-functional compound[1] |  |  | 79.88 |  |
| carbamate-functional compound[2] |  |  |  | 58.03 |

-continued

|  | Comparative Example A | Comparative Example B | Comparative Example C | Comparative Example D |
|---|---|---|---|---|
| carbamate-functional compound[3] |  |  |  | 64.97 |
| hexamethoxymethyl melamine | 13.13 | 13.13 | 24.52 | 15.84 |
| Fumed Silica Dispersion[4] |  | 15.18 | 15.18 | 15.18 |
| Additives and catalyst | 10.29 | 10.29 | 10.29 | 10.29 |
| Aromatic 100 | 7.00 | 7.00 | 7.00 | 7.00 |
| methyl propyl ketone | 21.16 | 14.83 | 21.72 | 3.69 |

The clearcoat coating compositions of the examples of the invention and of the comparison examples were applied over both a commercial High Solids Solvent Base Basecoat and a Water Base Basecoat and cured. Vertical and horizontal appearances of the clearcoats were observed and measured on Wave-Scan DOI. The panels prepared using the coating composition of Example 3 gave average improved vertical and horizontal appearance readings of 8% and had a smoother, less grainy appearance compared to the panels prepared using the coating composition of Comparative Example A, with equivalent pop and sag results. The panels prepared using the coating composition of Example 4 gave an additional average improved vertical and horizontal appearance readings of about 5%, with pop resistance of 2.1 mil and sag of 1.9 ml. The panels prepared using the coating composition of Example 5 gave equal vertical and 7% improvement of horizontal appearance readings for the Wave-Scan DOI compared to the panels prepared using the coating composition of Comparative Example C. Finally, the panels prepared using the coating composition of Example 6 improved vertical and horizontal appearance readings by 5% for the Wave-Scan DOI compared to the panels prepared using the coating composition of Comparative Example D, The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A thermosetting, non-polymeric coating composition consisting essentially of
   a monomeric material consisting of two or more carbamate groups and a hydrocarbon moiety with about 24 to about 72 carbon atoms,
   at least one crosslinker reactive with the monomeric material, and
   a crystalline reaction product of an amine and an isocyanate.

2. A thermosetting, non-polymeric coating composition according to claim 1, wherein the amine is a primary monoamine.

3. A thermosetting, non-polymeric coating composition according to claim 1, wherein the amine is selected from the group consisting of benzylamine, ethylamine, propylamine, butylamine, pentylamine, hexylamine, methylbutylamine, ethylpropylamine, ethylbutylamine, and combinations thereof.

4. A thermosetting, non-polymeric coating composition according to claim 1, wherein the isocyanate comprises 1,6-hexamethylene diisocyanate.

5. A thermosetting, non-polymeric coating composition according to claim 1, further comprising fumed silica.

6. A method of coating a substrate with a coating composition, having steps of:
   applying to the substrate a layer of thermosetting, non-polymeric coating composition according to claim 1; and
   curing the applied layer to produce a cured coating layer on the substrate.

7. A method according to claim 6, wherein the thermosetting, non-polymeric coating composition further comprises fumed silica.

8. A method according to claim 6, wherein the thermosetting, non-polymeric coating composition is applied as a clearcoat layer over a previously applied basecoat coating layer.

9. A thermosetting, non-polymeric coating composition according to claim 1, wherein the monomeric material is a member of the group consisting of:

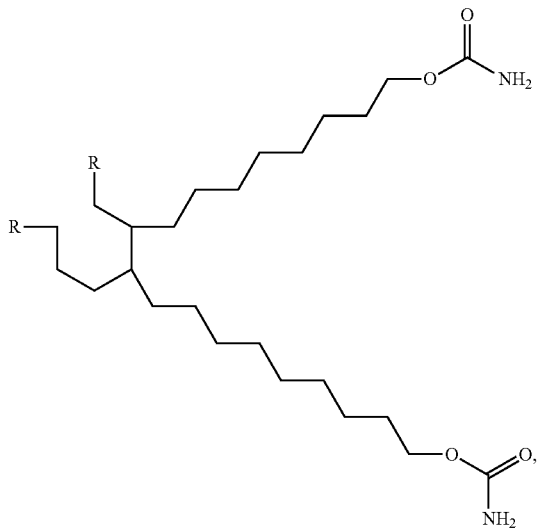

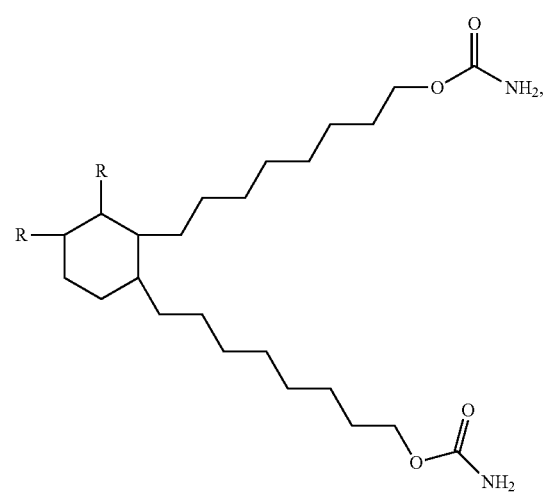
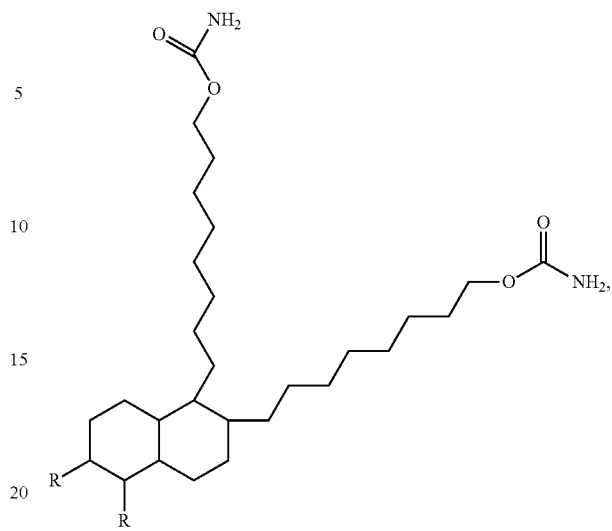
and combinations thereof, wherein each R group is independently an alkyl of 5 to 8 carbon atoms.
10. A method according to claim 6, wherein the monomeric material is a member of the group consisting of:
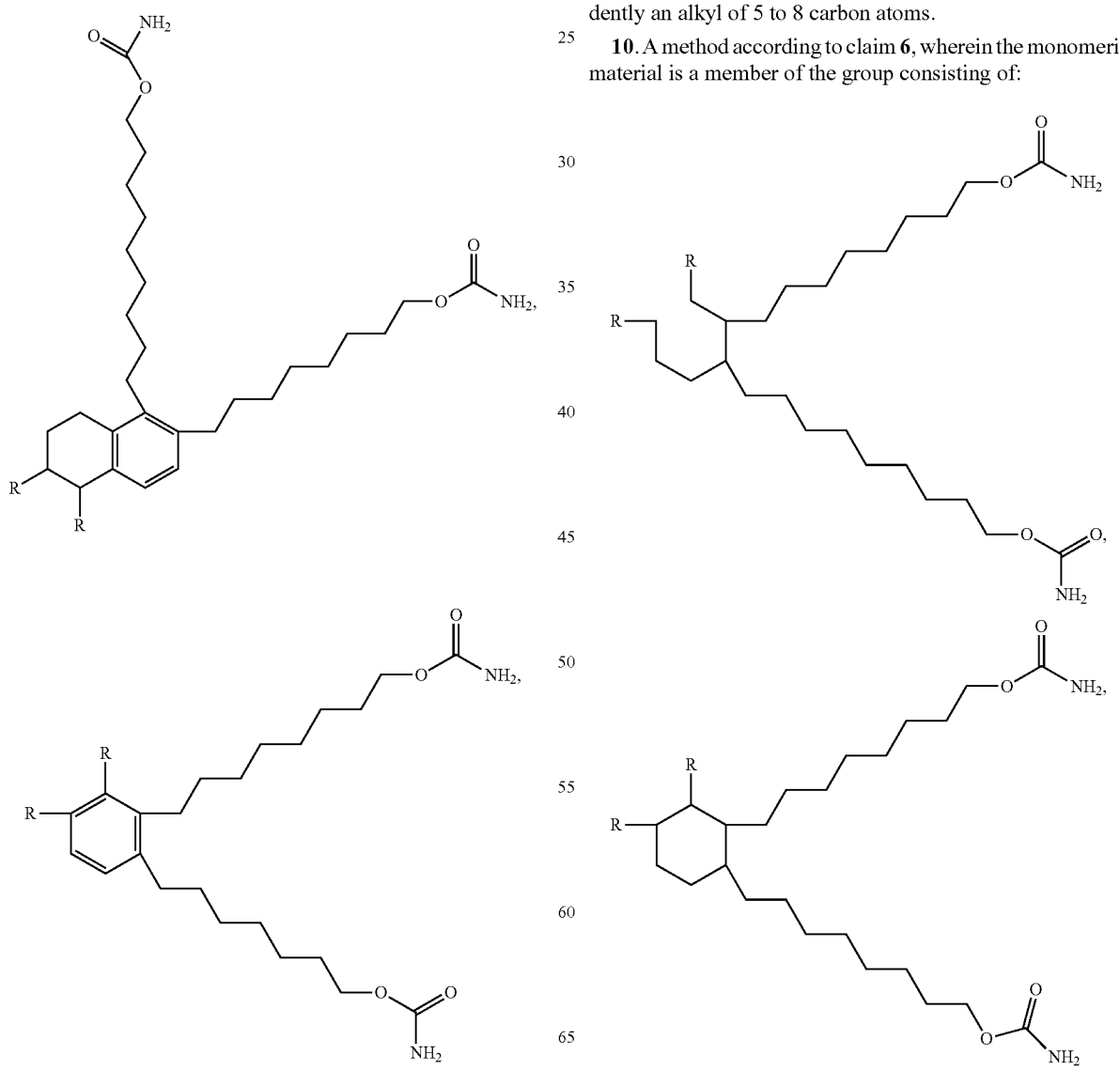

-continued

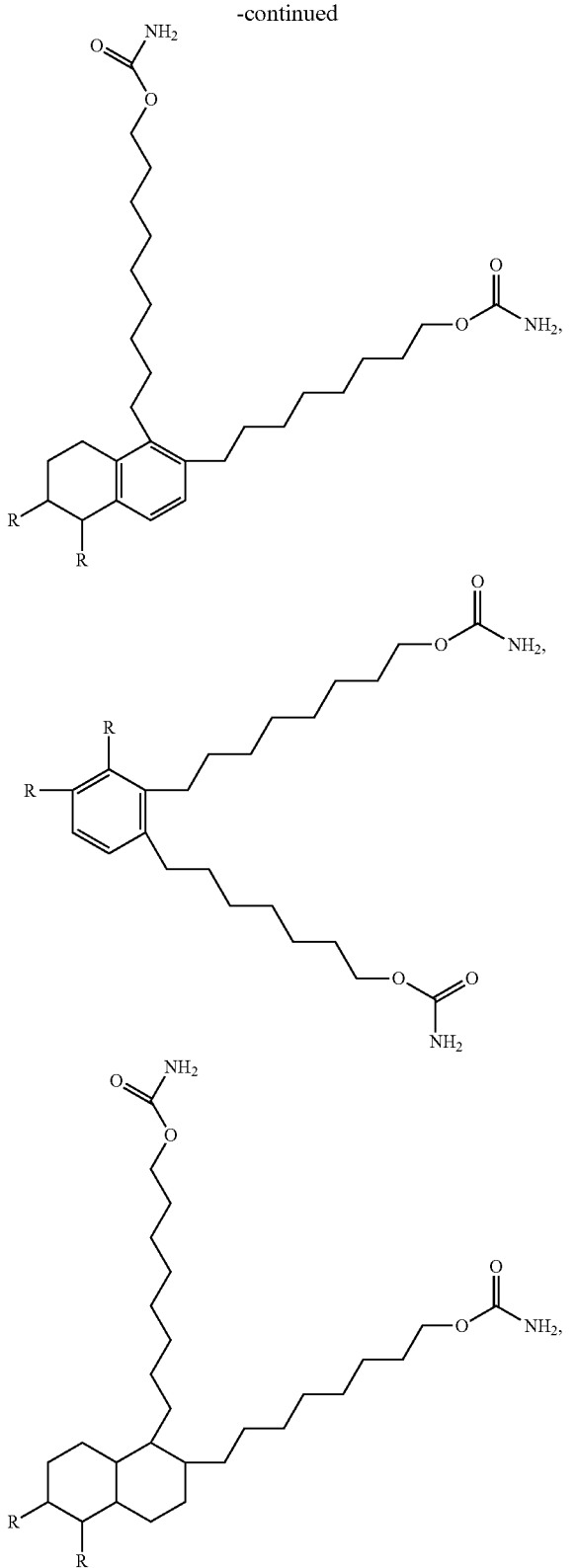

and combinations thereof, wherein each R group is independently an alkyl of 5 to 8 carbon atoms.

11. A thermosetting, non-polymeric coating composition consisting of
a monomeric material selected from the group consisting of: (a) compounds having two or more carbamate groups and a hydrocarbon moiety with about 24 to about 72 carbon atoms, (b) compounds having a hyperbranched moiety bearing functional groups; (c) reaction products made by reacting (c)(1) a hydroxyl group of a first compound that is the result of a ring-opening reaction between a compound with an epoxy group and a compound with an organic acid group and (c)(2) cyanic acid or a carbamate or urea group-containing compound; (d) carbamate-functional or terminal urea-functional reaction products of (d)(1) a compound comprising a carbamate or terminal urea group and an active hydrogen group that is reactive with (d)(2), and (d)(2) a lactone or an hydroxy carboxylic acid; (e) carbamate-functional or terminal urea-functional reaction products of a first material (e)(A) prepared by reacting (e)(A)(1) a compound comprising a primary carbamate or terminal urea group and a hydroxyl group and (e)(A)(2) a lactone or a hydroxy carboxylic acid and a second material (e)(B) that is reactive with a plurality of hydroxyl groups but that is not reactive with carbamate or urea groups; (f) carbamate-functional or terminal urea-functional reaction products of a first material (f)(A) prepared by reacting (f)(A)(1) a compound comprising a primary carbamate or terminal urea group and a hydroxyl group and (f)(A)(2) a lactone or a hydroxy carboxylic acid and a second material or materials (f)(B) that converts a hydroxyl group on the reaction product to a carbamate group or that comprises a group reactive with a hydroxyl group on the reaction product and a carbamate or urea group or group; (g) carbamate-functional or terminal urea-functional reaction products of (g)(1) a compound comprising a primary carbamate or terminal urea group and an hydroxyl group and (g)(2) a compound that is reactive with hydroxyl groups on a plurality of molecules of compound (g)(1), but that is not reactive with the carbamate or terminal urea groups on compound (g)(1); (h) carbamate-functional or terminal urea-functional reaction products of (h)(1) a first material that is the reaction product of a mixture including at least a polyisocyanate and an active hydrogen-containing chain extension agent with (h)(2) a compound comprising a group that is reactive with said first material and a carbamate or terminal urea group or group; and combinations thereof,
one or more crosslinkers reactive with the monomeric material,
a crystalline reaction product of an amine and an isocyanate,
optionally a solvent or solvents, and
optionally a member selected from the group consisting of catalysts, pigments, fillers, hindered amine light stabilizers, ultraviolet light absorbers, anti-oxidants, surfactants, stabilizers, wetting agents, rheology control agents, dispersing agents, adhesion promoters, and combinations thereof.

* * * * *

UNITED STATES PATENT AND TRADEMARK OFFICE
CERTIFICATE OF CORRECTION

PATENT NO. : 8,686,090 B2
APPLICATION NO. : 10/732850
DATED : April 1, 2014
INVENTOR(S) : Marvin L. Green et al.

Page 1 of 1

It is certified that error appears in the above-identified patent and that said Letters Patent is hereby corrected as shown below:

In the Claims

Column 15, lines 22-45, the chemical structure should appear as follows:

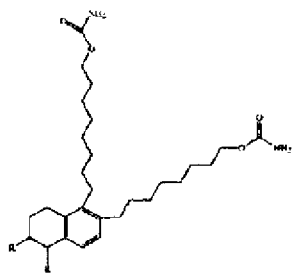

Column 17, lines 1-23, the chemical structure should appear as follows:

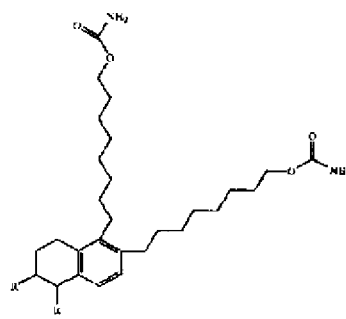

Signed and Sealed this
Second Day of September, 2014

Michelle K. Lee
*Deputy Director of the United States Patent and Trademark Office*